UNITED STATES PATENT OFFICE.

HARRY CLAY TAZEWELL, OF WILMINGTON, DELAWARE.

PLASTIC COMPOSITION AND PROCESS OF MAKING IT.

1,190,815.

Specification of Letters Patent. Patented July 11, 1916.

No Drawing. Application filed February 1, 1915. Serial No. 5,545.

*To all whom it may concern:*

Be it known that I, HARRY CLAY TAZEWELL, a citizen of the United States, residing in the city of Wilmington, county of New Castle, State of Delaware, have invented certain new and useful Improvements in Plastic Compositions and Processes of Making Them; and I do hereby declare the following to be a full, clear, and exact description of the invention, such as will enable others skilled in the art to which it appertains to make and use the same.

My invention relates to a new and useful composition of matter, particularly adapted to serve as a material from which can be molded or otherwise shaped articles adapted for use as insulators of heat and of electricity.

The basis of the composition is creosote oil, with which is associated shellac and a fibrous filling material. In substitution for a part of the shellac, a percentage of rosin may be employed, chiefly on account of its lesser cost, and alum is added to toughen the compound and to decrease its inflammability. To these ingredients is likewise added carbonate of magnesium, or its equivalent, for the purpose of lightening the specific gravity of the product, and finally, just before the molding operation, a quantity of hydrated lime may be added to the hot mixture, for the purpose of making the compound set more quickly and effectively.

As a typical instance of the preferred practice of the invention and of the relative proportions which I have found to give the best results, I may cite the following example: About half a pint of creosote oil is heated in an open vessel, steam jacketed at its sides and bottom, and receiving steam at a pressure of about 100 pounds per square inch. After the heating operation has proceeded for about one hour, a sufficient amount of short fibered asbestos is added to make a stiff pasty mass, which is permitted to cook for about one-half hour longer. Instead of the asbestos, some substitute may be employed which will not be injuriously effected by the action of the creosote oil; as, for instance, so-called "cotton paper," that is to say, paper of the kind made from cotton rags, which is used in the making of vulcanized fiber, or rags (preferably cotton rags) cut in pieces of about one inch square. About one-half pound of shellac is then added, the shellac being introduced gradually and with stirring, until it is homogeneously distributed throughout the mass. With the shellac, or immediately thereafter, one-quarter of a pound of rosin may be similarly incorporated in the mass; although it will be understood that the rosin may be omitted, provided a like quantity of shellac is added in addition to that originally introduced, the main purpose of using the rosin being to lessen the cost of the compound. About half an ounce of commercial potash alum is then added slowly and thoroughly stirred into the mixture, the purpose of the addition of the alum being to toughen and strengthen the compound, to raise its melting point somewhat, and particularly to make it fire-proof, *i. e.*, to lessen its liability to ignition. While still maintaining the heat, a sufficient quantity of carbonate of magnesium is then added to make a thin doughy mass, and the mass is then permitted to cook for about one hour, at which time it is ready for molding. Just before molding, as much of the compound as is needed to fill the mold is removed and a sufficient quantity of hydrated lime may be added to make the compound set fairly hard, on molding. The operation of thoroughly incorporating the hydrated lime in the mixture and then introducing it into the mold and completing the molding operation should be effected quickly, so that the mixture shall not set prematurely. The molding operation is preferably effected under pressure, and it is found that sharp castings are readily obtained, which castings are essentially separable from the mold dies. The sharpness of the castings obtainable with the compound is so pronounced that internal and external screw-threads may be cast with entire facility and with exact conformation of the dies employed in the casting operation.

To lesser advantage, a granular material, such as flour, may be substituted for the asbestos or for the "cotton paper," but the asbestos fiber or cotton paper (or cotton lint; that is to say, the cotton adhering to the cotton-seed after the hulling of the cotton-seed) is preferred, because it adds an additional element of strength to the product. So also, an equivalent may be employed instead of the carbonate of magnesium, whose main function is to lighten the mass and which has the additional advantage that it is highly refractory and that it is a good insulator both for heat and electricity. If desired, the compound may be given any desired color, by incorporating with it a suitable coloring ingredient, just before the molding operation takes place. Suitable coloring agents are, for instance, lamp black, litharge, oxid of iron, or the like.

The creosote oil which I have found particularly adapted to the practice of the invention is known commercially as "pine tar creosote." The hydrated lime is preferably of the kind known on the market as "limeoid" and is made from lime slaked at the kiln and seasoned and tempered in a steam vapor bath for 48 hours until hydration is complete and the excess moisture driven off; the dry powder is freed from over and under-burned lime, by air separation so as to give practically pure lime hydrate. The alum employed is potash alum.

It will be understood that instead of "limeoid," I may use air-slaked or steam-slaked lime, but with less advantage, the limeoid being particularly available because it is finely powdered and is very dry. The lime may, in fact, be wholly omitted, but its omission will involve the production of a material which would soften at a relatively low heat. Almost any degree of heat-resistance required up to the charring point of say between 400° and 500° may be obtained by varying the amount of the lime added.

What I claim is:

1. The method of producing a composition of matter suitable for the production of articles adapted for use as insulators of heat and electricity, which comprises heating a body of creosote oil, introducing therein a sufficient amount of a filling material to make a stiff pasty mass, introducing shellac into the mass and thoroughly incorporating it therein, adding alum to the mass to lessen its liability to ignition and then adding carbonate of magnesium to lighten the mass; substantially as described.

2. The method of producing a composition of matter suitable for the production of articles adapted for use as insulators of heat and electricity, which comprises heating a body of creosote oil, introducing therein a sufficient amount of a filling material to make a stiff pasty mass, introducing shellac into the mass and thoroughly incorporating it therein, adding alum to the mass to lessen its liability to ignition and then adding carbonate of magnesium to lighten the mass and finally adding hydrated lime to make the mass set more effectively when subsequently molded; substantially as described.

3. A new composition of matter adapted for the production of articles for use as insulators of heat and electricity, which comprises creosote oil, shellac, a filling material, and alum; substantially as described.

4. A new composition of matter adapted for the production of articles for use as insulators of heat and electricity, which comprises creosote oil, shellac, a filling material, alum and carbonate of magnesium; substantially as described.

5. A new composition of matter adapted for the production of articles for use as insulators of heat and electricity, which comprises creosote oil, shellac, a filling material, alum, carbonate of magnesium and hydrated lime; substantially as described.

6. A new composition of matter adapted for the production of articles for use as insulators of heat and electricity, which comprises creosote oil, shellac, a fibrous filling material, alum, carbonate of magnesium, and hydrated lime; substantially as described.

In testimony whereof I affix my signature, in presence of two witnesses.

HARRY CLAY TAZEWELL.

Witnesses:
CHARLES P. COLTON,
JOHN CRAIG.